United States Patent
Horst et al.

(10) Patent No.: US 9,704,200 B2
(45) Date of Patent: Jul. 11, 2017

(54) ITEMIZATION SYSTEM WITH AUTOMATED PHOTOGRAPHY

(71) Applicant: John Charles Horst, West Covina, CA (US)

(72) Inventors: John Charles Horst, West Covina, CA (US); James Lawrence Flanagan, IV, Hackensack, NJ (US); John Claude Hallak, Basking Ridge, NJ (US); Donald Canzoneri, San Dimas, CA (US)

( * ) Notice: Subject to any disclaimer, the term of this patent is extended or adjusted under 35 U.S.C. 154(b) by 47 days.

(21) Appl. No.: 14/028,383

(22) Filed: Sep. 16, 2013

(65) Prior Publication Data

US 2015/0081340 A1    Mar. 19, 2015

(51) Int. Cl.

| | |
|---|---|
| *G06Q 40/00* | (2012.01) |
| *G06Q 40/08* | (2012.01) |
| *G06Q 10/08* | (2012.01) |
| *H04N 5/232* | (2006.01) |
| *H04N 5/247* | (2006.01) |

(52) U.S. Cl.
CPC .......... *G06Q 40/08* (2013.01); *G06Q 10/083* (2013.01); *G06Q 10/0875* (2013.01); *H04N 5/23206* (2013.01); *H04N 5/23238* (2013.01); *H04N 5/247* (2013.01)

(58) Field of Classification Search
CPC .................................................. G06Q 10/087
See application file for complete search history.

(56) References Cited

U.S. PATENT DOCUMENTS

| | | | | |
|---|---|---|---|---|
| 6,009,189 | A  * | 12/1999 | Schaack | 382/154 |
| 6,301,440 | B1 * | 10/2001 | Bolle | 348/229.1 |
| 7,448,542 | B1 * | 11/2008 | Bobbitt | G06Q 20/208 |
| | | | | 186/61 |
| 7,970,658 | B1 * | 6/2011 | Fitch et al. | 705/26.1 |
| 2002/0141618 | A1 * | 10/2002 | Ciolli et al. | 382/104 |
| 2003/0144920 | A1 * | 7/2003 | Nakamoto | G06Q 30/0633 |
| | | | | 705/26.8 |
| 2003/0231769 | A1 * | 12/2003 | Bolle | H04L 9/0847 |
| | | | | 380/210 |
| 2004/0021792 | A1 * | 2/2004 | Yasui | 348/373 |
| 2005/0012817 | A1 * | 1/2005 | Hampapur | H04N 7/185 |
| | | | | 348/143 |
| 2006/0178902 | A1 * | 8/2006 | Vicars | G06F 21/64 |
| | | | | 705/51 |
| 2006/0243797 | A1 * | 11/2006 | Apte | G06Q 20/20 |
| | | | | 235/383 |

(Continued)

*Primary Examiner* — Chika Ojiaku
(74) *Attorney, Agent, or Firm* — Sheppard, Mullin, Richter & Hampton LLP

(57) ABSTRACT

Systems and methods for implementing itemization systems with automated photography are disclosed. An itemization task may include an itemization process and a photography process that uses a first camera set to a first field of view and a second camera set to a second field of view to take a first and second photo of an item undergoing itemization. The first and second cameras automatically take photos of the item based on user input during an itemization process. The first and second cameras remain stationary and do not require repositioning or refocusing when a new item is itemized. The itemization process may be performed using 10-key input.

17 Claims, 12 Drawing Sheets

(56) References Cited

U.S. PATENT DOCUMENTS

| | | | |
|---|---|---|---|
| 2007/0201694 A1* | 8/2007 | Bolle | G06T 1/0021 380/205 |
| 2008/0010365 A1* | 1/2008 | Schneider | 709/223 |
| 2008/0033847 A1* | 2/2008 | McIntosh | G06Q 10/087 705/28 |
| 2008/0147625 A1* | 6/2008 | Altounian et al. | G06Q 10/087 |
| 2008/0296392 A1* | 12/2008 | Connell, II | G06Q 20/208 235/472.01 |
| 2010/0124357 A1* | 5/2010 | Hampapur | G06T 7/2046 382/103 |
| 2010/0169169 A1* | 7/2010 | Connell, II | G06N 99/005 705/7.39 |
| 2012/0130759 A1* | 5/2012 | Davenport | G06Q 10/0631 705/7.12 |
| 2013/0064531 A1* | 3/2013 | Pillman et al. | 396/62 |
| 2013/0332616 A1* | 12/2013 | Landwehr et al. | 709/227 |
| 2014/0081690 A1* | 3/2014 | Winters | 705/7.15 |
| 2014/0101004 A1* | 4/2014 | Marseille et al. | 705/30 |

\* cited by examiner

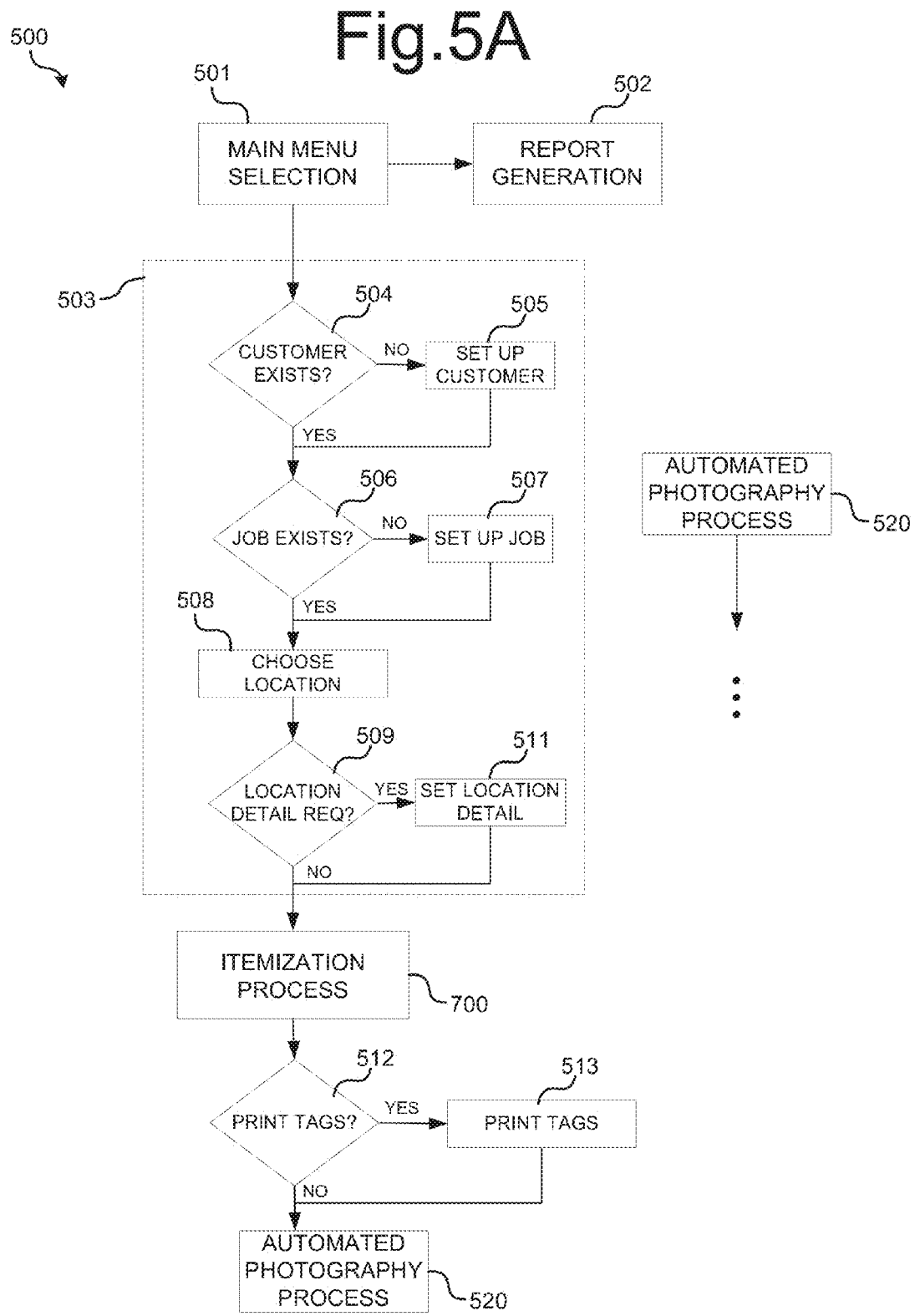

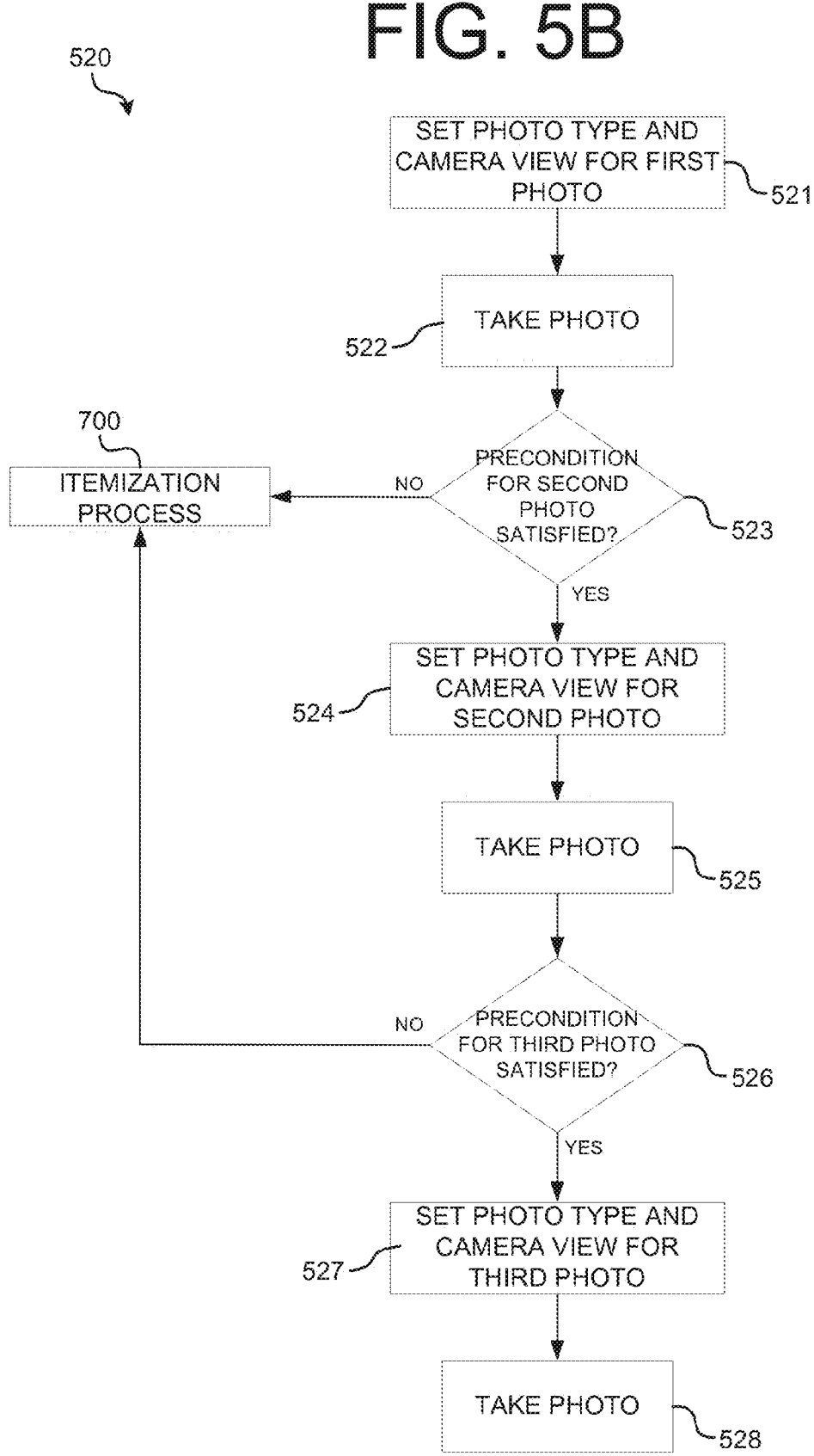

Fig.8

| MENUS — 801 | TOGGLES — 802 | FLAGS — 803 | OTHER — 804 |
|---|---|---|---|
| GROUP<br>CATEGORY<br>ITEM<br>COLOR<br>PATTERN<br>MATERIAL<br>SIZE<br>GENDER<br>DAMAGE<br>OTHER | RUSH<br>REJECT<br>TAGGING | ASSIST<br>COUTURE<br>WAND | QUANTITY<br>HELP<br>ADD PICTURE<br>MANUAL ENTRY |

ITEMIZATION SYSTEM WITH AUTOMATED PHOTOGRAPHY

TECHNICAL FIELD

The present disclosure relates generally to itemization, and more particularly, some embodiments relate to systems and methods for implementing itemization systems with automated photography.

DESCRIPTION OF THE RELATED ART

Following a disaster such as fire or flooding in a home or building, clothing and other textiles require immediate cleaning or restoration. Insurance companies may commission the work to restoration service providers with various requirements. These requirements may include, for example, cleaning and returning some articles of clothing to the homeowner within 24 hours, and preparing a detailed quote of all the items within 72 hours. Such quotes typically require an itemized list that includes item descriptions, price break down, full documentation of permanently damaged clothing, photographs of individual items, photographs documenting damages, and manufacture labels for high-end items.

Data requirements in such settings may depend on the category of job being processed. A job may be classified, for example, as regular, total loss, or rush. A regular job includes the items that are returned once disaster remediation of the building is completed. A total loss job includes irreversibly damaged items for which the insured will receive compensation. Rush jobs include emergency or important items that need to be expedited and returned to the insured within 48 hours or less. Depending on the type of job needed, the requirements of the job may vary. A total loss job, for example, may require detailed item identification information such as material, size, brand, and manufacturer, in addition to any needed photographs and other requirements. A regular job, on the other hand, may simply require a brief item description in addition to any needed photographs and other requirements.

Conventional itemization software systems and methods used in the above settings are not well suited to handle the requirements. Restoration companies generally implement two approaches. In one approach, a pre-sorting of type of job is performed and then each job is processed through a Point-of-Sale (POS) system. These systems usually incorporate a mouse or touch screen for data entry and require constant monitoring of the display screen during data entry. In another approach, a manual or semi-manual system with spreadsheets is utilized to gather data. Such systems may be followed up with a POS for preparing the bill.

Both of the above conventional approaches are not well suited to process large orders. Additionally, neither of the above approaches incorporates integrated solutions that use cameras for obtaining images. These above approaches require a separate step for obtaining photographs, which are not seamlessly indexed to item descriptions. Moreover, because of the high overhead costs, these approaches generally avoid providing a full chain of custody for individual items from pickup to customer return. Because data entry speed, use of photographs, and chain-of-custody are important when processing large quantities of items with strict deadlines, alternative systems for itemization are desired.

Web-based itemization approaches that integrate photography have been initiated to address some of these issues and provide more effective tools for itemization. In one such approach, a handheld computing device (e.g., a tablet or smartphone) takes photographs of items. The itemization and pricing use voice recognition. This approach, however, has significant drawbacks. First, the method of photography has a delay associated with focusing and composing the shot and is particularly laborious when a garment is inspected and positioned for photography while trying to itemize simultaneously. Secondly, the voice recognition itemization requires a low noise environment, requires speaking in the same manner with each descriptor spoken in the same manner and same order, and extensive voice training of the system. Thirdly, this approach has been developed with hard coding limiting the system's flexibility to changing requirements.

BRIEF SUMMARY OF THE DISCLOSURE

According to various embodiments of the disclosed systems and methods, automated photography is implemented in itemization systems. In one embodiment, a system includes a non-transitory computer readable medium with instructions configured to perform an itemization process and a photography process. The photography process includes taking a first field of view photo of an item using a first camera set to a first field of view. In this embodiment, the photography process is automatically performed based on user input during the itemization process. This embodiment may further include taking a second field of view photo of the item using a second camera set to a second field of view if a precondition is satisfied. In one embodiment, the itemization process is performed using 10-key input from a user.

In another embodiment, a pre-itemization process is performed prior to the itemization process. The pre-itemization process may include setting up a customer if a customer does not exist for the itemization task; and setting up a job if a job does not exist for the itemization task.

In another embodiment, the first and second cameras are IP cameras. In a different embodiment, the first and second cameras are included in an integrated camera module with a first field of view and a second field of view. In this embodiment, the integrated camera module takes the first field of view photo and second field of view photo.

In yet another embodiment, the first photo and second are transmitted to a server for storage. In this embodiment, the itemization and photography processes may be prioritized over transmitting the first and second photos over a network to a server.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

FIGS. 5A-5B are operational flow diagrams illustrating an example process for performing an itemization task and an automated photography process that may be performed by the itemization application of FIG. 3.

FIG. 8 is an example set of menus, toggles, flags, and other operations that may be implemented by the itemization process of FIG. 7.

Figure 1:
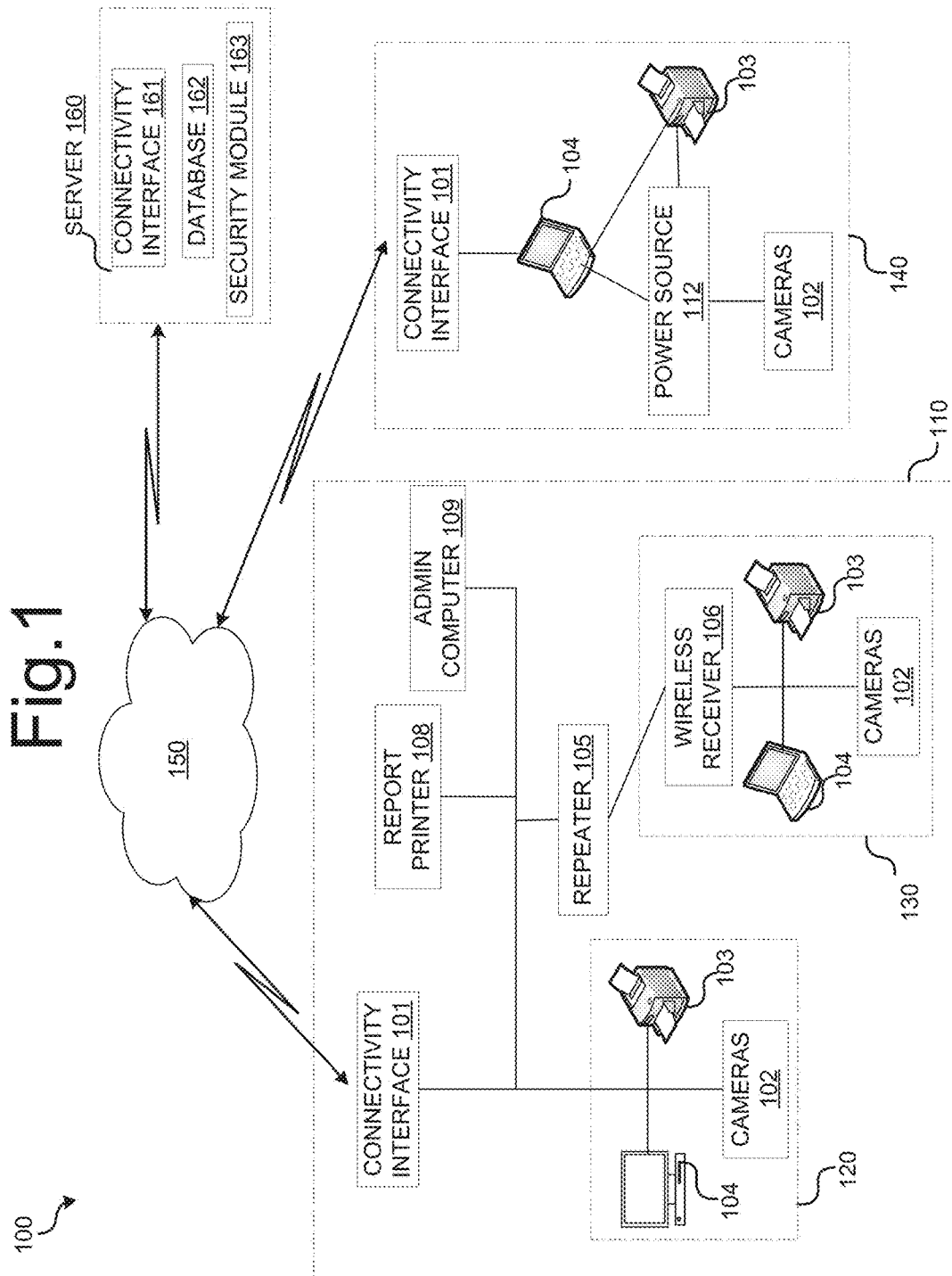
FIG. 1 illustrates an example communications environment for implementing the itemization systems and methods in accordance with one embodiment of the invention.

The figures are not exhaustive and do not limit the disclosure to the precise form disclosed.

DETAILED DESCRIPTION OF THE EMBODIMENTS OF THE DISCLOSURE

The present disclosure is directed toward systems and methods for providing efficient itemization with integrated automated photography. Before describing the invention in detail, it is useful to describe an example environment in which the disclosure may be implemented. One such example is that of a restoration services environment, where restoration of articles of clothing and other items damaged during a building disaster (e.g. fire or flooding) are covered, at least in part, by a third-party provider or payor such as an insurance carrier. The insured party may be the building owner, a company, or other entity.

In this example environment, the third-party provider requires that the restoration party or business perform an itemization task. The itemization task requires that the restoration party itemize the clothing and other items in accordance with various requirements. Requirements may include, for example, providing item identifying information such as item type, color, pattern, material, size, brand, gender, manufacturer, and other identifying information. Requirements may additionally include providing damage information, item labels or tags, and item photographs such as a full item photograph, a damage photograph if there is item damage, and a brand or label close up photograph of details.

The third-party provider itemization requirements depend on the job category associated with a particular item. A job category specifies how an item is processed. Four example job categories that may be used to process an item are rush, total loss, reject, and regular. A regular job category is processed normally and typically requires minimal item information and attaching a barcode tag to an item. A rush job category is expedited and typically requires minimal item information, item label photos, and a rush barcode tag. Total loss and reject job categories determine that an item is not salvageable (and thus, the third-party provider compensates the insured party) and typically require extensive item information but not barcode tags. In exemplary implementations of the present disclosure, all job categories require photography. The type of photography required depends on the job category.

The items associated with a particular job category may depend on requests or requirements from the insured party and insurer. For example, the insured party may request that certain essential items such as dress clothing be rushed. The insured party may also request that items from a particular room of the building be rushed. In another example, the insurer may specify predetermined conditions under which the insurer may classify particular items as a total loss. During itemization, the restoration party may classify an item under a particular job category based on these requests and requirements, and based on its own determination of the state of an item.

The restoration party may collect the items and itemize them at an indoor or outdoor itemization station (e.g. its place of business or other facility it uses for itemization). Outdoor itemization stations may be required for itemization tasks that process contaminated and/or dirty items. Alternatively, the restoration business may itemize the items at an on-site itemization station (i.e. at or in the general vicinity of the building disaster site).

FIG. 1 illustrates an example communications environment 100 for implementing the itemization systems and methods in accordance with one embodiment of the invention. Communications environment 100 may include a communications medium 150, one or more local itemization networks 110 with one or more indoor itemization stations 120 and one or more outdoor itemization stations 130, one or more on-site itemization stations 140, and a server 160. During itemization, each itemization station may communicate with server 160 via connectivity interface 101 through communication medium 150 if a network connection is available.

Communication medium 150 may comprise a communications network such as a cellular telephone network, a satellite network, an ad hoc network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. The medium 150 may be a wireless network system such as a cellular network, a wireless personal area network, a wireless local area network, or other similar communication medium. The medium alternatively may be a wired system, such as a coaxial cable system, a fiber optic cable system, an Ethernet cable system, or other similar communication medium.

In this exemplary environment, each itemization station (120, 130, and 140) includes a computing device 104, one or more cameras 102, and an optional item tag printer 103. Computing devices 104 are configured to run an itemization application (described further below) locally and/or through server 160. Computing devices 104 may comprise, but are not limited to, a workstation, desktop, laptop, notebook, and a hand-held device such as a tablet or smartphone. Cameras 102 may wirelessly connect to computing device 104 via a wireless communication protocol such as Bluetooth or a 802.11x wireless LAN protocol. Alternatively, cameras 102 may directly connect to computing device 104 via wired connection using a variety of interfaces, such as Ethernet, USB 2.0, USB 3.0, Thunderbolt, HDMI or other available interfaces.

A local itemization network 110 may correspond to a restoration party's business local or facilities. Local Itemization network 110 may support a plurality of indoor itemization stations 120 and a plurality of outdoor itemization stations 130. Itemization stations 120 and 130 may be configured to work on different itemization tasks, or the same itemization task. If an outlet is unavailable for outdoor stations 130, a power source (not pictured) such as an uninterruptable power supply (UPS) may be used to provide power to its devices (e.g. computing device, printer, and cameras). The devices and power source may be arranged in any suitable configuration for powering the devices.

Local itemization network 110 may include a repeater 105 configured to deliver a wireless networking signal to outdoor itemization stations 130 via wireless receiver 106. Local itemization station 110 may also include a report printer 108 configured to print itemization reports, and one or more admin computers 109 configured to monitor, manage, and/or configure itemization stations 120 and 130. Local itemization station 110 may additionally include a scanner (not pictured) for scanning barcode tagged items for storage or in preparation for delivery.

On-site itemization stations 140 may be required for itemization tasks that must be performed at or in the vicinity of the disaster site. Because a power outlet is generally unavailable at on-site itemization stations 140, a power source 112 such as a UPS may be used to provide power to its devices (e.g. computing device, printer, and cameras). The devices and power source may be arranged in any suitable configuration for powering the devices. For example, the power source may directly power computing device 104, cameras 102, or printer 103, which may act as a hub for other devices requiring power. Alternatively, the power source may connect to a power hub that connects to computing device 104, printer 103, and cameras 102. In these implementations, power may be carried through the same cables as data.

In a particular implementation of on-site itemization station 140, the power source connects directly to computing device 104 and printer 103, and to an injector (not pictured) that connects to cameras 102. In this implementation, the injector may be a Power over Ethernet (PoE) device and cameras 102 may be IP cameras. The printer and injector may connect to connectivity interface 101 (e.g. a hotspot and wireless router combination) via Ethernet and the computer may connect to the connectivity interface 101 wirelessly.

Server 160 includes a connectivity interface 161 for communicating over communication medium 150, a database module 162 and a security module 163. These modules may be disposed within server 160 or communicatively attached to server 160. In one implementation, server 160 comprises a plurality of servers implemented as a distributed server system.

Database module 162 is configured to store and organize itemization information (e.g. photographs and item detail information) associated with itemization tasks. Database module 162 may be configured to support itemization tasks performed by multiple itemization stations (and optionally, multiple companies). Additionally, database module 162 may provide itemization management software that allows insured parties, insurers, or restoration parties to view past or present itemization tasks, and make specific requests or comments in relation to those itemization tasks.

The security module 163 of server 160 may perform authentication of any access request (upload or download) by an insured party, an insurer, or a restoration party (e.g. an itemization station 120, 130, or 140). Security module 163 may use any number of authentication methods. For example, it may use password authentication, digital signature authentication, IP SEC authentication, Secure Sockets Layer (SSL) authentication, public-key cryptography authentication, and other methods.

Figure 2:
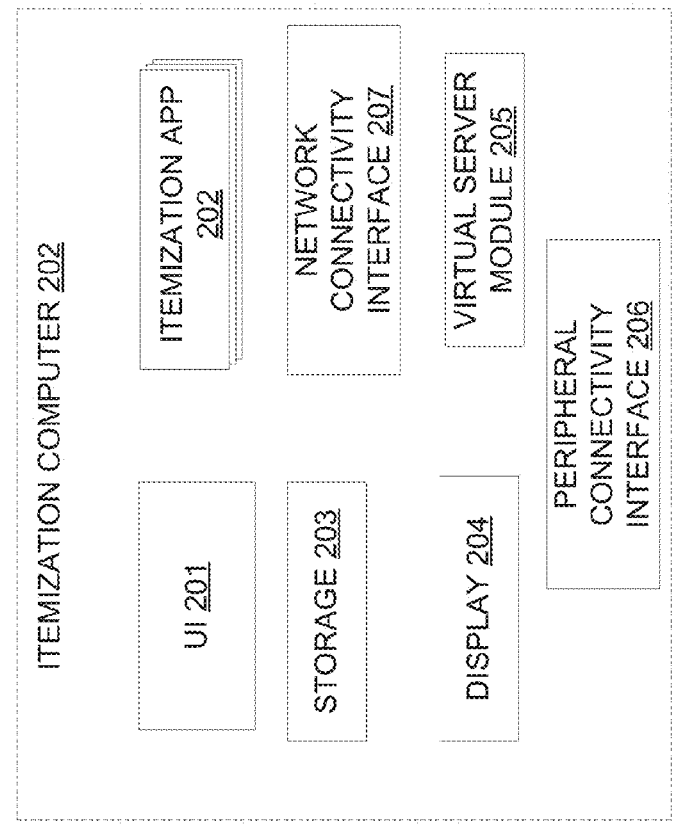
FIG. 2 is a high-level block diagram of a computing device that may be used in the communications environment of FIG. 1.

FIG. 2 is a high-level block diagram of a computing device 202 that may be used in the communications environment of FIG. 1. Computing device 202 may include a user interface (UI) 201, an itemization application 202 (further described below) for itemizing items, a storage 203, a display 204, a virtual server module 205, a peripheral connectivity interface 206, and a network connectivity interface 207. User interface 201 may be configured to allow user input (e.g. keyboard, mouse, touch, or voice recognition) into itemization application 202 for display on display 204. In one implementation, display 204 allows a user of computing device 202 to monitor the placement of items from the cameras field of view during an itemization task.

Peripheral connectivity interface 206 includes one or more peripheral input ports for devices such as a tag printer, cameras, and a UI device. These input ports may optionally power connected devices. In one implementation, peripheral connectivity interface 206 and network connectivity interface 207 are integrated.

Virtual server module 205 is configured to allow the offline operation of computing device 202 during an itemization task. Offline operation may be needed during a period of network outage, high network latency, or for the operation of on-site itemization stations 140 where there are no network connectivity options (e.g. cellular hotspot and satellite connections are unavailable). If network connectivity is unavailable, computing device 202 may use virtual server module 205 to run its own virtual server and save all acquired itemization data (e.g. item information and photographs) on local storage 203. Once network connectivity is reestablished, the itemization data stored on local storage 203 may be synchronized with server 160.

Figure 3:
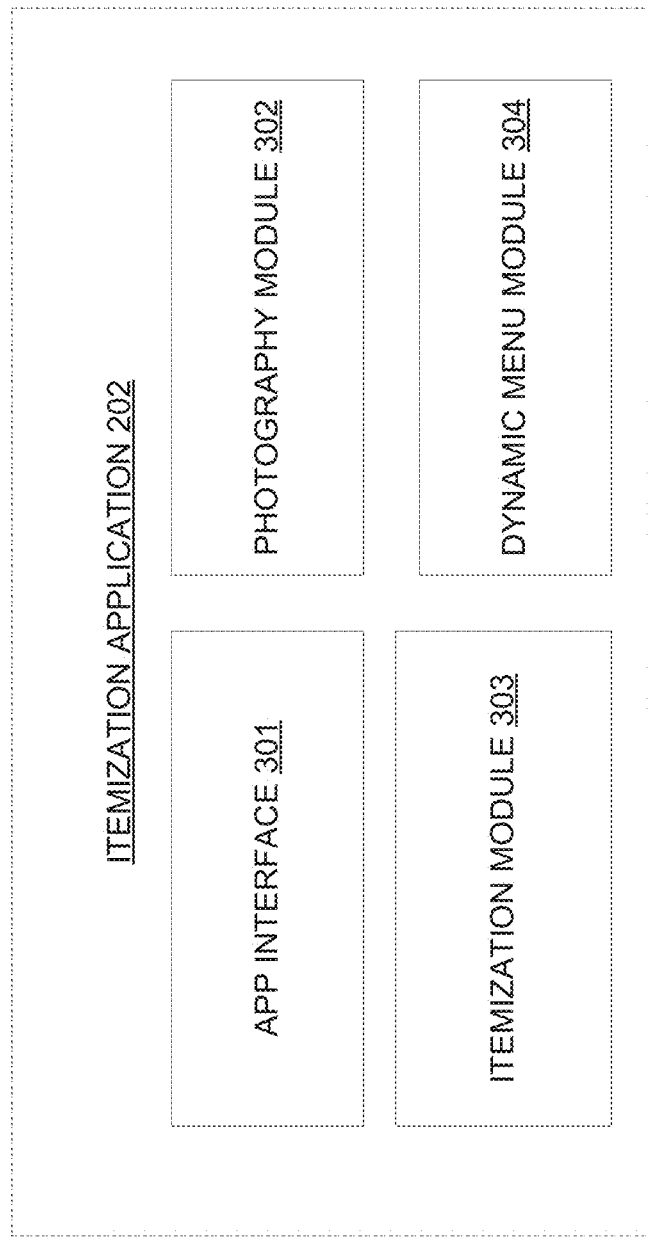
FIG. 3 illustrates an itemization application that may be implemented by the computing device of FIG. 2.

FIG. 3 illustrates an itemization application 202 that may be implemented by the computing device of FIG. 2 to perform an itemization task. Itemization application 202 comprises an application interface 301, a photography module 302, an itemization module 303, and a dynamic menu module 304. These modules may be integrated in any combination. Application interface 301 may allow a user of itemization application 202 to interact with the application via user interface 201 and perform operations such as selecting item detailing information during an itemization process (further described below) and moving between menus. Photography module 302 is configured to perform a photography process (further described below) during the itemization task and may directly interact with itemization module 303. Itemization module 303 is configured to perform an itemization process (further described below) during the itemization task and may directly interact with itemization photography module 302 and dynamic menu module 304. Dynamic menu module 304 is configured to perform a dynamic menu process that may be implemented by the itemization process performed by itemization module 303. Together, these modules allow the efficient completion of an itemization task.

Figure 4:
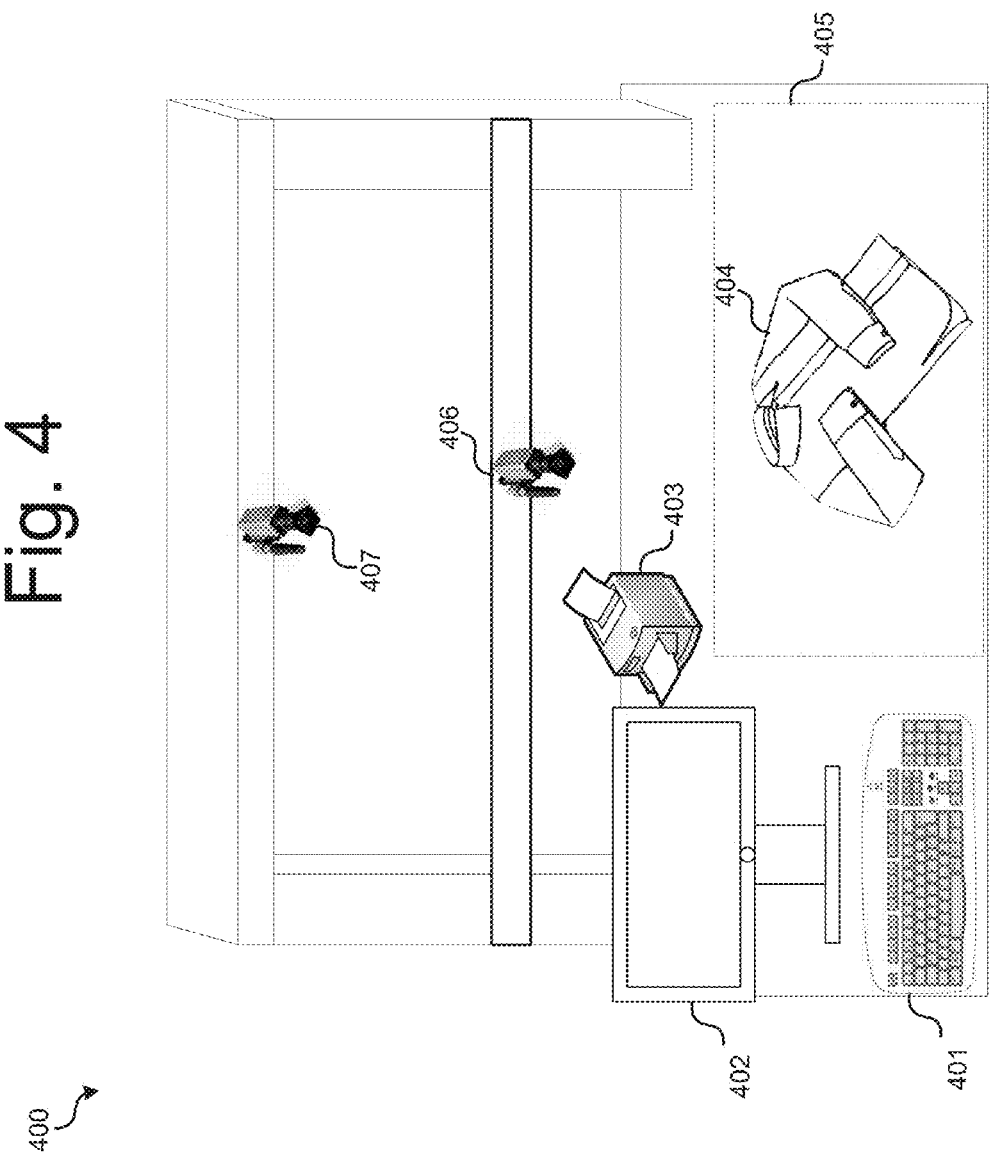
FIG. 4 illustrates an exemplary itemization station configuration that may be used in conjunction with the itemization application of FIG. 3.

FIG. 4 illustrates an exemplary itemization station configuration that may be used in conjunction with the itemization application of FIG. 3. Itemization station 400 includes a keyboard 401 for user input, a computing device 402, a tag printer 403, an article of clothing or other item 404 undergoing itemization, an itemization placement region 405, and cameras 406-407. Itemization station 400 may use any of the variety of network configurations and interfaces (not pictured) described above.

In this exemplary configuration, during performance of an itemization task, camera 406 is configured to take a first field of view photo and camera 407 is configured to take a second field of view photo. Camera 406 and 407 are preferably configured such that no user time is spent adjusting the cameras' field of view (i.e. zoom and position) when items are photographed. Moreover, in this configuration, cameras 406-407 are preferably focused on itemization placement region 405 such that the itemization application (automatically) or a user (manually) does not spend any time focusing the camera while performing an itemization task. This configuration provides the benefit of avoiding the delay associated with focusing (manual or automatic) in existing itemization systems. In alternative implementations, the field of view and focus of cameras 406-407 may be manually or automatically adjusted while performing an itemization task.

If an item cannot be placed in itemization placement region 405 (e.g. it is too large or toxic), desired photos may be taken via alternative cameras (not pictured) in another area separate from or attached to the described itemization station of FIG. 4. In an alternative implementation, cameras 406-407 may also be used to take photos of these items. Itemization may be performed for these items.

Cameras 406-407 are configured to take a plurality of different photograph types. Exemplary photography types may include a main photograph of the entire item or a substantial part of the item, an item label or tag photograph (e.g. clothing label or tag), a damage photograph (single or multiple images), and an additional photograph (multiple images). During photography, a user of the station may position item 404 in itemization placement region 405 such that cameras 406-407 do not require field of view or focus adjustments, i.e., the cameras 406-407 remain stationary. To facilitate positioning of item 404, display 402 may dynamically display the fields of view of cameras 406-407 during photography.

Photographs taken by cameras 406-407 are saved as image files. These image files may be stored on a local storage connected to computing device 402. These images files may also be stored in a server database. In one implementation, the photograph images are compressed prior to transfer to the local storage. In another implementation, the transmission of the photographs to a server database takes lower priority than any itemization or photography process performed by the itemization application. Images may be annotated with image type descriptors (e.g. main, label, damage, and additional) and metatags. Image metatags may be created for both the image title and keywords associated with the image. Metatag data beyond the image name may include, for example, image type, color, pattern, brand, location, etc. This metatag data enables searches of the images.

In one implementation, cameras 406-407 are a single integrated camera module with two fields of view and two focuses. This integrated camera module may include, for example, a dual lens and dual focus camera. In another implementation, additional cameras may be included to take other photos. These additional cameras may also have a fixed field of view and focus during performance of the itemization task.

Keyboard 401 is configured to take user input during performance of an itemization task. In the exemplary configuration of FIG. 4, keyboard 401 is used to perform an itemization process using ten-key input. Ten-key input uses the digits 0 through 9 on the keyboard (e.g. the numpad, the top row of numbers, or any other 0-9 digit arrangement) for menu selection. A sequential menu selection may be predefined based on ten-key input such that most or all inputs during itemization may be selected using the digits 0-9. In other implementations, other keyboard keys (e.g. + − . / *) are used to perform itemization in addition to or instead of the digits 0-9. In one implementation, a customized keyboard is used.

In one implementation, dynamic menus are implemented with ten-key input. Dynamic menus may be used to change a menu entry for an item. Dynamic menus may also be implemented such that a predefined sequential menu selection depends on the selected job category (e.g. rush, total loss, reject, or regular) for an item. In this implementation, a default configuration menu for a job category defines the menus that are required. A user of the itemization application may modify this default configuration menu.

In another implementation, where not all required user inputs can be incorporated within the ten-key sequential menu operation, other frequently utilized non-sequential entries are accessible using other numpad keys (e.g. * . −/+).

In another implementation, only menus required for a particular job category are included in the predefined sequential menu that uses ten-key input. In this implementation, optional menus may be selected using other keys such as, for example, "c" for color.

Ten-key input provides several benefits over existing itemization methods used in this environment. Particularly, ten-key input provides single-handed entry and does not require the user to look at the keyboard 401 or display of computing device 402. This permits the expeditious movement from one item to the next during performance of the itemization task. Moreover, ten-key input with a sequential predetermined menu ordering minimizes the keystrokes need to complete an itemization process.

FIG. 5A is an operational flow diagram illustrating an example process 500 of performing an itemization task using itemization application 202. Process 500 may be performed for one or more items that are itemized. The operations of process 500 may be implemented based on user input, predefined itemization application 202 process rules, or some combination thereof. Any inputs (user-generated or application generated) entered during process 500 may be stored at an itemization system implementing itemization application 202. For example, an input may be stored in a local storage connected to a computing device running itemization application 202, a database server, or some combination thereof. In this exemplary process, an automated photography process 520 may be implemented parallel to a user-initiated process that includes an itemization process 700. For example, as a user enters inputs for an item during itemization process 700 (further described below), automated photography process 520 takes photos. Alternatively, automated photography process 520 waits until all itemization inputs have been received for an item before all photos are taken. In both implementations, operations performed by automated photography process 520 may depend on the outputs by itemization process 700. In yet another embodiment, a combination of both implementations may be used, where automated photography process 520 runs in parallel to itemization process 700 and is optionally triggered after all itemization inputs have been received if more photos are needed.

With reference to the user-initiated process, at operation 501 a user makes a main menu selection. A main menu selection may include, for example, an administrator interface selection (not pictured), a report generation (502), or a pre-itemization process (503). A report generation operation 502 may generate a report for a type of job category (e.g. rush, total loss, reject, or regular) associated with the itemization task. Alternatively, a report generation operation 502 may generate a report for the entire itemization task or a subset of items itemized during the itemization task. A report includes descriptive information associated with an item (e.g. item type, color, pattern, material, size, brand, gender, manufacturer, damage, etc.) and may optionally include one or more images for each item included in the report (e.g. low resolution thumbnails or high resolution photos). A report may also include links to item images (e.g. uncompressed images) uploaded to a server. These links may be html addressable and may be defined to be loaded into an online spreadsheet with desired formatting. In one implementation, a report generation operation 502 may not be performed if sufficient itemization data (e.g. photos and item information) has not been gathered to generate a report for a particular itemization task.

At operation 503, a pre-itemization process is optionally performed prior to beginning an itemization process. A pre-itemization process checks if one or more data inputs associated with the itemization task have been entered. The data inputs that are checked during a pre-itemization process may be predefined. In one implementation, no checks are made and the pre-itemization process is skipped. FIG. 5A illustrates an example set of checks.

For example, at operation 504, the pre-itemization process checks that a customer (e.g. insured party) exists for the itemization task. If a customer does not exist, at operation 505, the customer's information (e.g. name, address, phone, data, etc.) is entered in the itemization system implementing itemization application 202. At operation 506, the pre-itemization process checks that a job has been set up for the itemization task. If a job has not been set up, at operation 507 the job is entered into the itemization system. Multiple jobs may be associated with each customer in the system. At operation 508, a location associated with the itemization task is entered into the itemization. At operation 509, the pre-itemization process checks if location detail is required for the itemization task. If location detail is required, at operation 511 location detail is set. Location detail may include the location of specific items, for example, a dresser (detail) is in the master bedroom (location).

Figure 6:
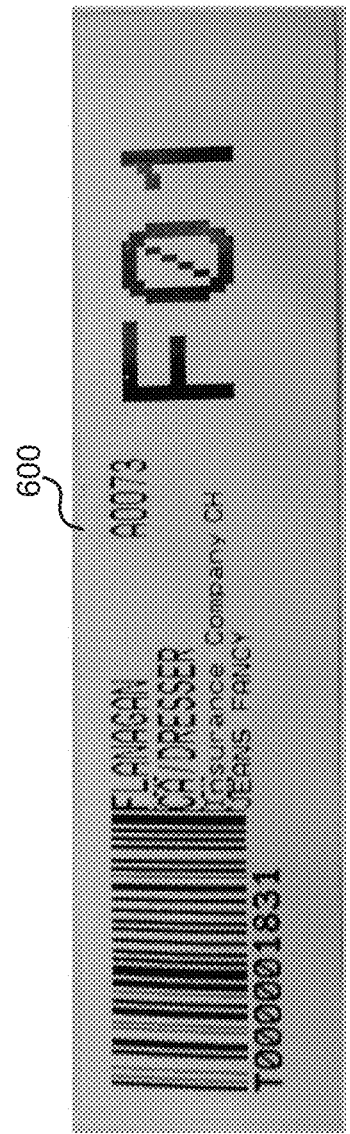
FIG. 6 is a diagram illustrating an example item barcode tag that may be printed during an itemization task process.

Once the pre-itemization process is completed (if it was performed), an itemization process (further described in FIGS. 7 and 8) is performed at operation 700. At operation 512, depending on the inputs entered during itemization process 700 (e.g. job category) item barcode tags are or are not printed. If item barcode tags need to be printed, at operation 513 item barcode tags are printed. FIG. 6 illustrates an exemplary tag 600 that may be printed for an item. A tag includes information such as a unique tag number and barcode, an item number within a job, an item's location in a building, location detail, name of the insured party, name of the insurance company, the job operator or restoration party name, the item category, tag creation date, brief description of item, etc.

With a completed itemization process 700 for an item and optionally printed tags, an automated photography process 520 may then be performed. FIG. 5B illustrates an exemplary implementation. In this exemplary implementation, at least one photo is automatically taken for an item, and a second and a third photo may be taken. Selection of a camera view in this process includes automatically selecting one of a plurality of cameras in the itemization station for taking the photo. In this implementation, the selected camera is neither refocused nor repositioned. The zoom of the selected camera is also not changed. In other implementations, such parameters for the selected camera may be changed automatically by itemization application 202 or manually by a user. Moreover, in this implementation, depending on the selected photo type, more than one photo may be taken during a photo taking operation (e.g. 522, 525, 528).

Automated photography process 520 may commence after all itemization input for an item has been received. Alternatively, automated photography process 520, may be triggered by the entry of certain input (e.g. item damage input or input indicating the item is valuable). When a photo is taken during process 520, the process may prompt the operator to position the item prior to taking the photo or the process may take the photo without prompting.

At operation 521, a first photo type and first camera view for a first photo are automatically selected. At operation 522, a photo is taken. At operation 523, automated photography process 520 checks if a precondition for a second photo has been satisfied. The precondition may be satisfied based on item data entry (e.g. damage or label) during itemization process 700. If the precondition has not been satisfied, the automated photography process 520 does not take a second photo and a new itemization process 700 may begin for another item. Alternatively, if automated photography process 520 runs parallel to itemization process 700, automated photography process 520 may wait at operation 523 for further itemization data input for the item. If the precondition has been satisfied, at operation 524, a second photo type and second camera view for a second photo are automatically selected. At operation 525, a photo is taken. At operation 526, automated photography process 520 checks if a precondition for a third photo has been satisfied. If the precondition has not been satisfied, the automated photography process 520 does not take a second photo and a new itemization process 700 may begin. Alternatively, if automated photography process 520 runs parallel to itemization process 700, automated photography process 520 may wait at operation 526 for further itemization data input. If the precondition has been satisfied, at operation 527, a third photo type and third camera view for a third photo are automatically selected. At operation 528, a photo is taken.

In one implementation, photos types may include, for example, main, label and damage photos. In another implementation, preconditions required for taking a second and third photo may include, for example, whether an item label has been identified, whether an item has been identified as valuable, and whether an item has been identified as damaged. In another implementation, a user of itemization application 202 may override automated photography process 520 by requiring it to take multiple photos for a photo type or by requiring it to take other types of photos. At any time during an itemization, the user may reinitiate automated photography process 520 to take photos or may take additional photos.

Figure 7:
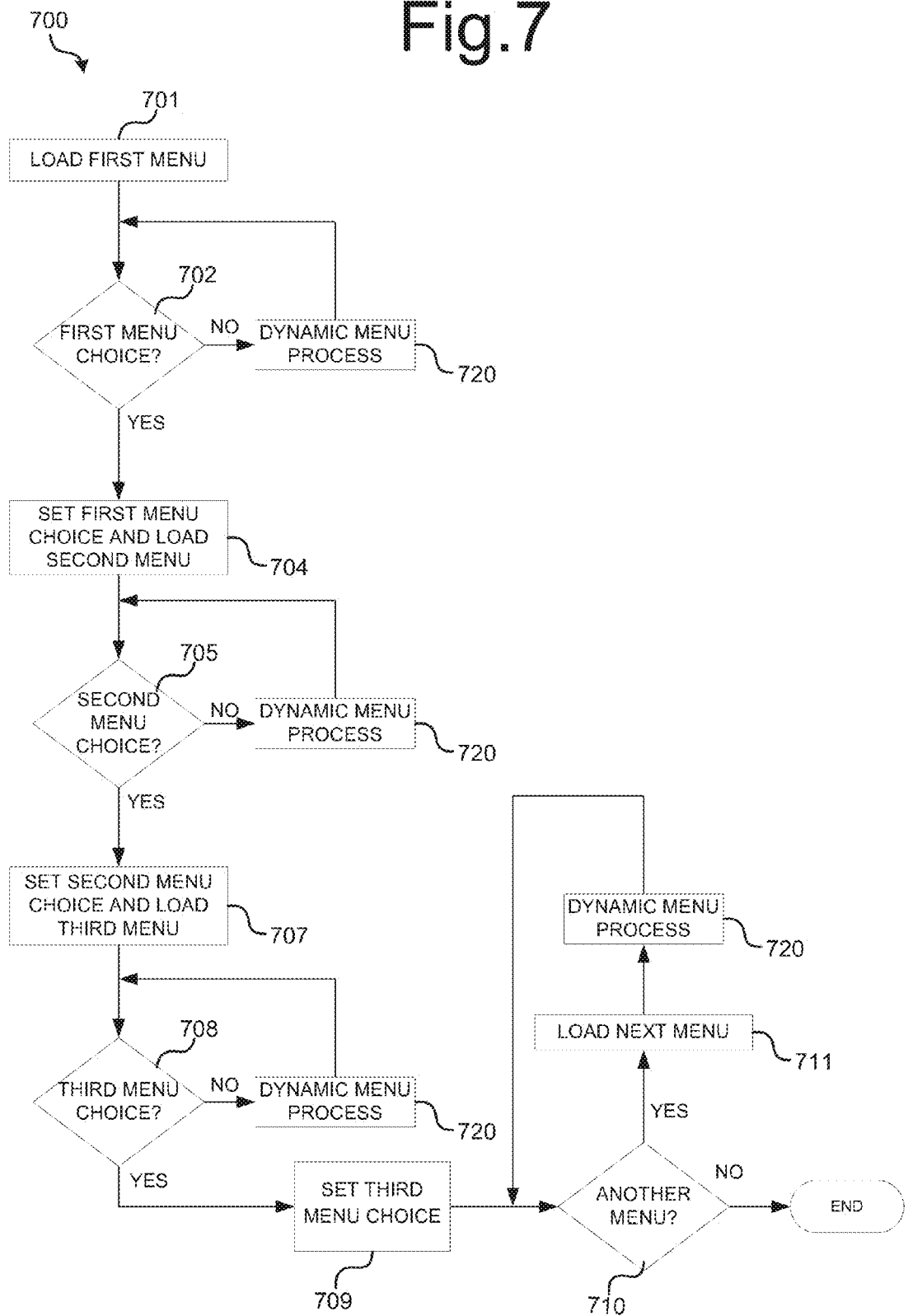
FIG. 7 is an operational flow diagram illustrating a 10-key input based itemization process.

FIG. 7 is an operational flow diagram illustrating an example 10-key input based default itemization process 700 that may be implemented in process 520. In itemization process 700, menu choices are sequentially predefined and mapped to a 10-key input. A user of itemization application 202 selects menu choices by inputting one of the mapped 10-key input digits 0 through 9 (in other implementations, other keyboard inputs may be used). In this exemplary process, a default set of menu choice operations 702, 705, and 708 have been sequentially predefined as a default process for itemizing (i.e. entering item identifying information) an item. Assuming a user follows the default itemization process (i.e. it is all that is needed to itemize the item undergoing itemization), at operation 701 a first menu is loaded. At operation 702 the user makes a first menu choice 702 based on the loaded first menu. At operation 704, the first menu choice is set and a second menu choice is loaded. At operation 705 the user makes a second menu choice based on the loaded second menu. At operation 707, the second menu choice is set and a third menu choice is loaded. At operation 708 the user makes a third menu choice based on the loaded third menu. At operation 709, a third menu choice is set. Assuming no other item identifying information needs to be entered, at operation 710 the user does not select another menu and itemization process 700 ends for the item.

If, on the other hand, the user determines at operation 702, 705, 708, or 710 that the default sequential operations are insufficient for itemizing the item (because, for example, the item needs to be flagged for further review, the item is damaged, the item is valuable, the item requires a special note, etc.) at operation 720 a dynamic menu process is performed. The dynamic menu process 720 may be used to perform an additional item detailing operation, change or reset the default configuration (the sequence of operations and/or the operations themselves) of the operations in process 700, and/or restart itemization process 700.

In one implementation, itemization process 700 has fewer than three default menu choices. In another implementation, itemization process 700 has more than three default menu choices. The number of default menu choices may be user defined, job defined, or defined by the itemization application.

FIG. 8 is an example set of menus 801, toggles 802, flags 803, and other operations 804 that may be set using dynamic menu process 720. A user may toggle between menus (e.g. color, pattern, material, size, gender, damage, etc.) used to detail a particular item during itemization. A user may also toggle between menus to restart the itemization process. Using a single key entry a user may select toggles 802 to toggle between job operation modes (e.g. rush or reject). Depending on the toggled job operation modes, the predefined sequential menu choices (i.e. the dynamic menus) may change. A user may also select toggles 802 to toggle any predefined automatic item tagging on and off. Flags 803 (e.g. assist, couture, wand) may be selected to flag an item for various reasons (e.g. for further review, because the item description is unsure, or because the item is valuable). Other operations 804 may include, for example, an item quantity selection, a help function selection, a user request for an additional photo, or manual entry of a description or note for the item.

Dynamic menus may be used to change a menu entry for an item. Dynamic menus may also be implemented such that a predefined sequential menu selection depends on the selected job category (e.g. rush, total loss, reject, or regular) for an item. In this implementation, a default configuration menu for a job category defines the menus that are required. A user of the itemization application may modify this default configuration menu.

Other keys besides 0-9 (e.g. c * −/+) may be included in the dynamic menu process so that a user can add another item descriptor by choosing the key. The selection of other keys may also open new menus with 0-9 entry.

The use of dynamic menus in the itemization process provides several benefits over existing itemization processes used in this environment. First, by predefining what item descriptors are required, the number of keystrokes needed for item detailing is minimized. Second, sight-free operation is possible with key-input memorization. This permits the user of the itemization application to position an item while it is being itemized to prepare it for photography.

Figure 9:
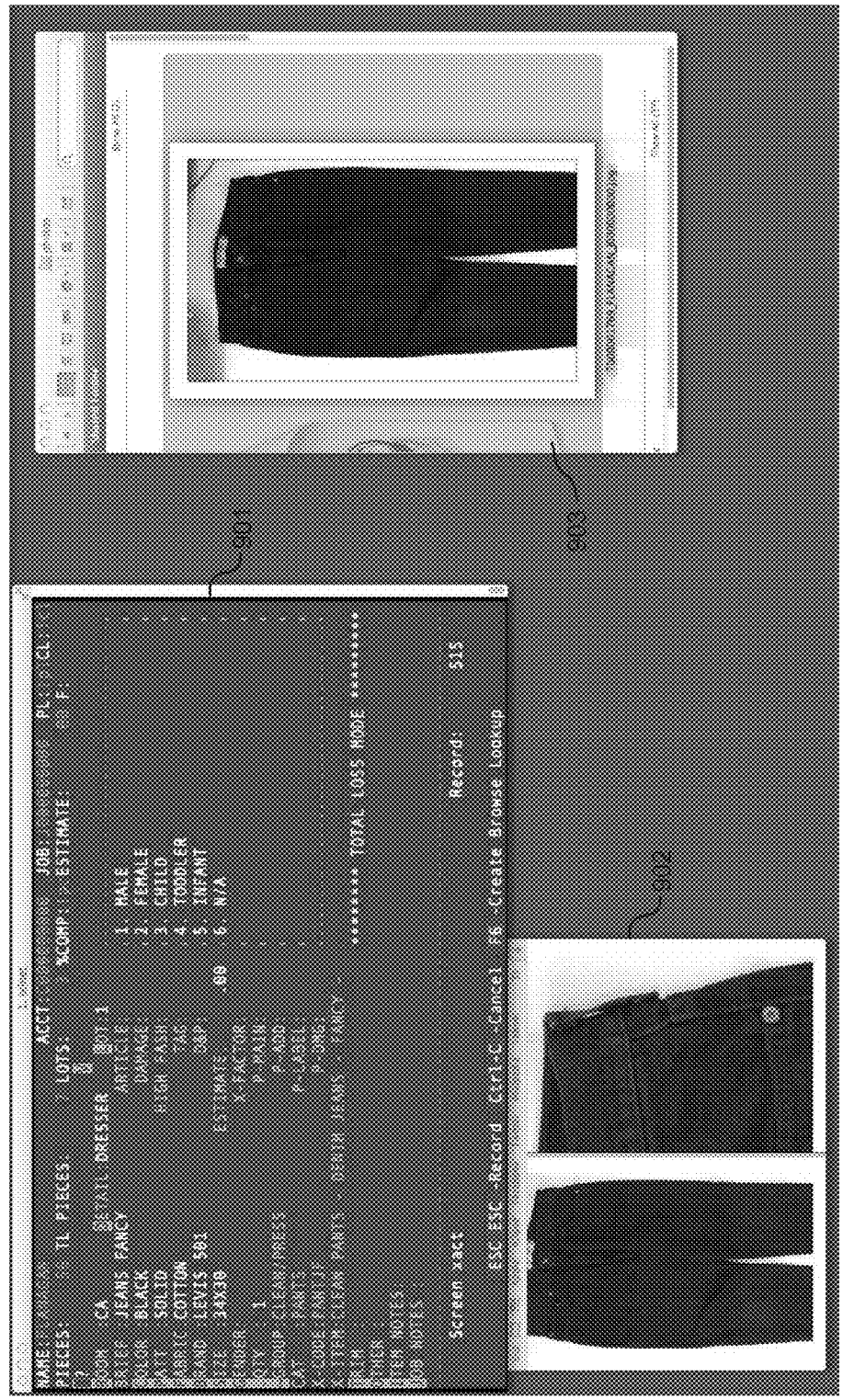
FIG. 9 is a diagram illustrating an example user interface for an itemization application.

FIG. 9 is a diagram illustrating an example user interface 900 for an itemization application. User interface 900 includes an itemization data entry interface 901 for performing an itemization process using 10-key input, a dynamic display 902 of the cameras fields of view, and an example item photograph 903 locally stored in the computing device running the itemization application.

Once an itemization job has been completed for a customer or insured party, some or all of the items are prepared for delivery to the customer. Delivery preparation may include the generation of an item delivery manifest (i.e. list of items being delivered to customer). The delivery manifest may include item detail and photos. The tag creation process may facilitate delivery preparation, including the tracking of items (chain of custody).

Figure 10:
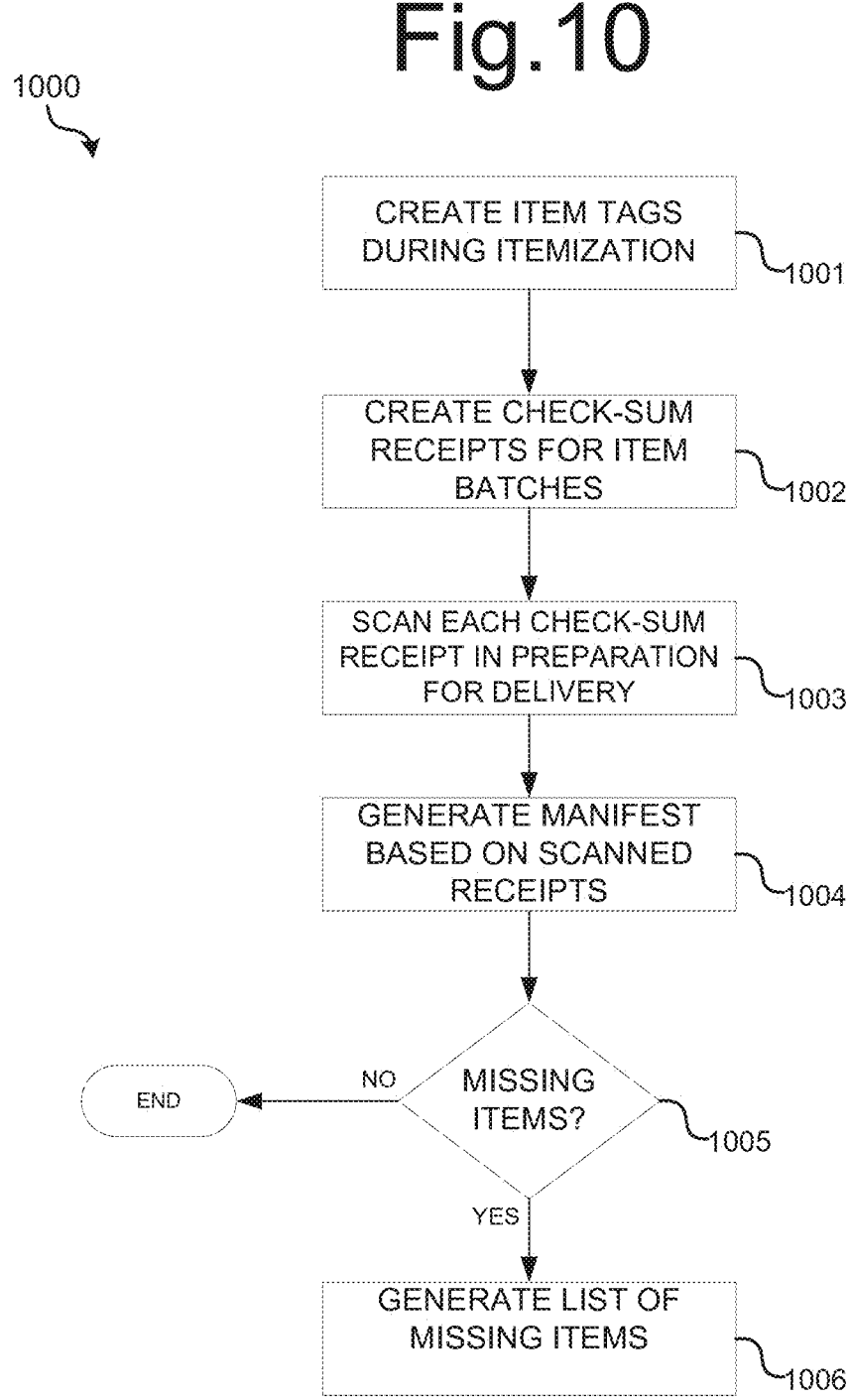
FIG. 10 illustrates a method of preparing an order of itemized items for delivery using check-sum receipts.

FIG. 10 illustrates a method of preparing an order of itemized items (e.g. a completed job) for delivery using check-sum receipts. At operation 1001, item barcode tags are created during an itemization job process (described above). Each created item barcode may be permanent or temporary and includes, for example, information such as the lot number, item number, home location, job coordinator, if the item was flagged or damaged, and insurance company. Barcode tags may optionally not be created for particular items, for example, total loss or rejected items. To facilitate the processing of items, barcodes may be customized depending on the item's job type (e.g. a rush item barcode or a regular item barcode).

At operation 1002, check-sum receipts are created for item batches. This operation particularly benefits large jobs (e.g. orders of 500 or more items). Individually scanning each item barcode for large orders when loading a delivery transport (e.g. vehicle or plane) is impractical. During itemization, work may be done in batches. As a batch of work is put into storage awaiting delivery, the batch may be scanned to a check-sum receipt. The check-sum receipt may list customer name, job number, and the quantity of items represented by the receipt. The check-sum receipt may be affixed to the group of items in any accessible way (e.g. affixed to a box of items then sealed with tamper proof tape or hung on a hanger for hanging items).

At operation 1003, each check-sum receipt is scanned prior to loading the batch of items into a delivery transport for delivery. To facilitate this operation, the check-sum receipt associated with each batch of items may have been attached to the batch of items in various accessible manners. For example, for articles of hanging clothing, the checksum receipt may have been attached to the neck of a hanger. Scanning a check-sum receipt scans all item barcodes associated with the receipt. To provide optimal chain-of-custody, the quantity of hung items is verified prior to scanning the check-sum receipt, assuring the batch integrity remains correct. In one implementation, operation 1003 may further include scanning barcodes for any individual items that are not part of a check-sum (e.g. a large rug).

At operation 1004, a manifest is generated, creating a list of the items loaded for delivery (e.g. loaded into a delivery van). The generation of the manifest may automatically occur as each check-sum receipt (and, optionally, barcode for items without a check-sum) is scanned or after all check-sum receipts (and, optionally, barcodes for items without a check-sum) have been scanned. If items are missing (operation 1004), a list of missing items may optionally be generated at operation 1005. The missing item list may include item detail and photos. The delivery manifest and missing item list may be automatically uploaded to a server for viewing by the insured party, third party provider, or the restoration party.

In an alternative implementation, the process of creating check-sum receipts may be skipped and items may be individually scanned during delivery preparation to create the manifest. The use of this alternative process may be predetermined by the job size (e.g. a small job) or level of accountability required.

The described delivery preparation process provides the benefit of a fully accountable and auditable method of item delivery without the need of time-consuming assembly or invoicing. Such a process facilitates full chain of custody from item tallying to delivery. Moreover, such a process facilitates locating missing items.

Figure 11:
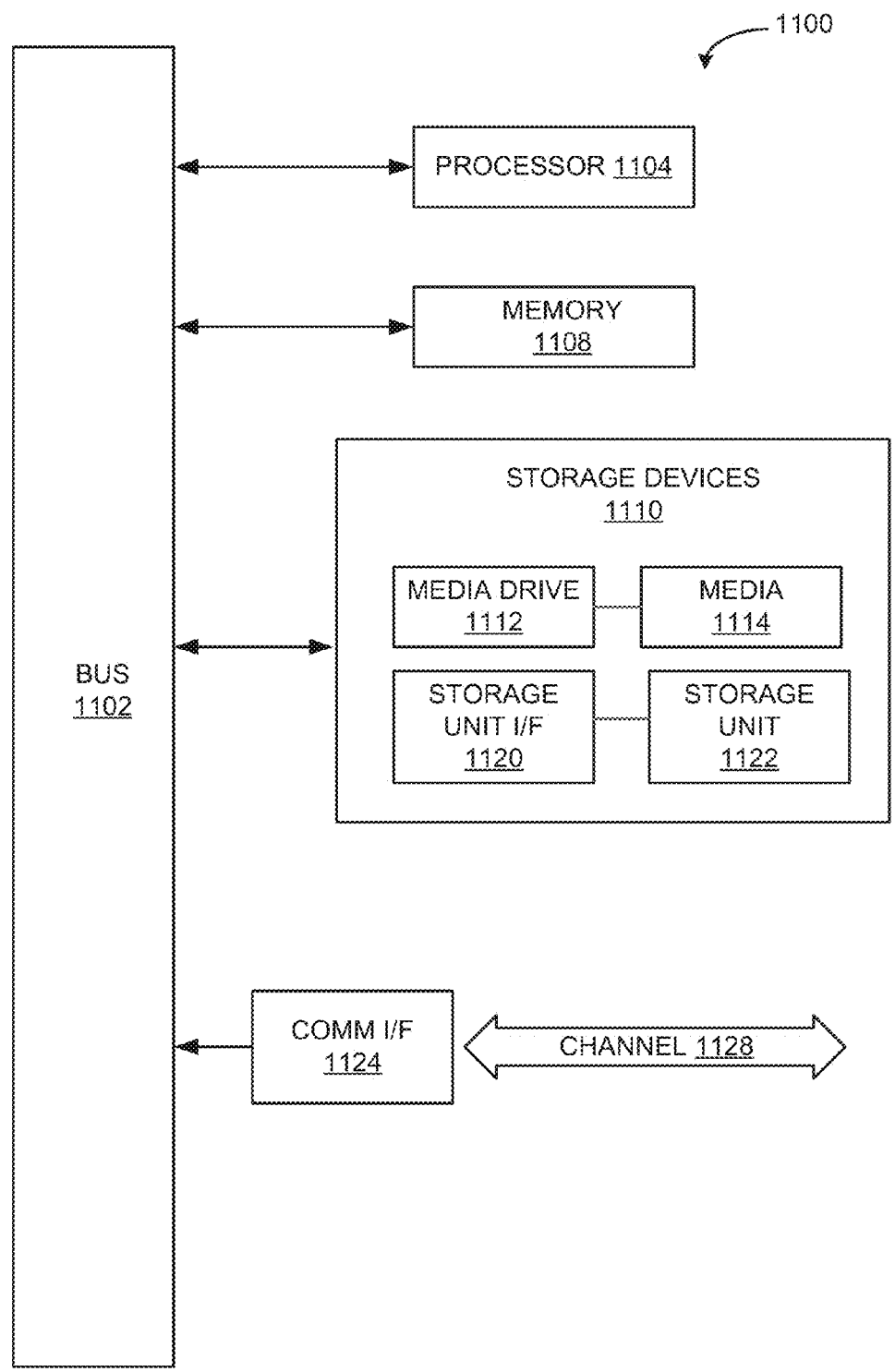
FIG. 11 illustrates an example computing module that may be used to implement various features of the system and methods disclosed herein.

FIG. 11 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 11. Various embodiments are described in terms of this example-computing module 1100. After reading this description, it will become apparent to a person skilled in the relevant art how to implement the application using other computing modules or architectures.

Referring now to FIG. 11, computing module 1100 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1100 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1100 might include, for example, one or more processors, controllers, control modules, or other processing devices, such as a processor 1104. Processor 1104 might be implemented using a general-purpose or special-purpose processing engine such as, for example, a microprocessor, controller, or other control logic. In the illustrated example, processor 1104 is connected to a bus 1102, although any communication medium can be used to facilitate interaction with other components of computing module 800 or to communicate externally.

Computing module 1100 might also include one or more memory modules, simply referred to herein as main memory 808. For example, preferably random access memory (RAM) or other dynamic memory, might be used for storing information and instructions to be executed by processor 1104. Main memory 1108 might also be used for storing temporary variables or other intermediate information during execution of instructions to be executed by processor 1104. Computing module 1100 might likewise include a read only memory ("ROM") or other static storage device coupled to bus 1102 for storing static information and instructions for processor 1104.

The computing module 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a solid state drive, a magnetic tape drive, an optical disk drive, a CD or DVD drive (R or RW), or other removable or fixed media drive might be provided. Accordingly, storage media 1114 might include, for example, a hard disk, an integrated circuit assembly, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into computing module 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory module) and memory slot, a PCMCIA slot and card, and other fixed or removable storage units 1122 and interfaces 1120 that allow software and data to be transferred from the storage unit 1122 to computing module 1100.

Computing module 1100 might also include a communications interface 1124. Communications interface 1124 might be used to allow software and data to be transferred between computing module 1100 and external devices. Examples of communications interface 1124 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1100 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   a first camera set to a first field of view;
   a second camera set to a second field of view; and
   a computer communicatively coupled to the first and second cameras and comprising:
      a processor; and
      a non-transitory computer readable medium having instructions embedded therein that, when executed by the processor, cause the computer to:
         display on a display the first field of view and the second field of view wherein at least a portion of an item is positioned such that the item is displayed in each of the first field of view and the second field of view;
         display on a display an itemization graphical user interface;
         receive information identifying the item generated by a user by physical manipulation of one or more keys of a keyboard, wherein the physical manipulation of each key of the one or more keys causes entry of information identifying the item and selection of a menu at the itemization graphical user interface, the information identifying the item comprising at least one of the item's type, color, pattern, material, brand, manufacturer, value, label, tag, or damage; and
         in response to receiving the information identifying the item generated by the user by physical manipulation of the one or more keys, performing a photography process, comprising:
            taking a first field of view photo of the item using the first camera the first field of view photo corresponding to the displayed first field of view;
            determining if a precondition for taking a second field of view photo of the item has been satisfied, wherein the precondition has been satisfied if the received information identifying the item comprises at least one of: identification of an item label or tag, identification of the item as valuable, or identification of the item as damaged; and
            in response to determining that the precondition for taking the second field of view photo of the item has been satisfied, taking a second field of view photo of the item using the second camera, the second field of view photo corresponding to the displayed second field of view, wherein each of the first camera and the second camera do not change field of view during the photography process.

2. The system of claim 1, wherein receiving the information identifying the item generated by a user by physical manipulation of one or more keys of the keyboard comprises: selecting a plurality of menus at the itemization graphical user interface in response to user entry at a 10 key number pad of the keyboard, wherein entry of a key of the 10 key number pad causes addition of an item descriptor and selection of one the plurality of menus, and wherein selection of the plurality of menus corresponds to selecting the information identifying the item.

3. The system of claim 2, wherein the instructions, when executed by the processor, are further configured to:
associate a first plurality of predefined menu choices in a predefined sequential order with a first toggle, each of the first plurality of predefined sequential menu choices associated with a descriptor of an item; and
receive data corresponding to user input selecting the first toggle,
wherein selecting each of the plurality of menus at the itemization graphical user interface in response to user entry at the 10 key number pad comprises selecting each of the first plurality of predefined menu choices in the predefined sequential order.

4. The system of claim 2, wherein the first camera and second camera are internet protocol cameras.

5. The system of claim 2, wherein the instructions, when executed by the processor, are further configured to:
create searchable image metatags for the first photo and the second photo using at least the received information identifying the item; and
transmit the first photo and second photo over a network to a server for storage.

6. The system of claim 2, further comprising: a storage configured to store the first photo and second photo, wherein the instructions, when executed by the processor, are further configured to: create searchable image metatags for the first photo and the second photo using at least the received information identifying the item.

7. The system of claim 2, wherein the steps of displaying on a display the first field of view and the second field of view, receiving data generated by a user by physical manipulation of one or more user input devices of the computer, and performing a photography process in response to receiving data comprising information identifying an item are repeated for a plurality of items.

8. The system of claim 2, wherein the first camera and second camera are an integrated camera module with a first field of view and a second field of view, and wherein the integrated camera module takes the first field of view photo and second field of view photo.

9. A computer-implemented method, comprising:
displaying on a display a first field of view corresponding to a first camera and a second field of view corresponding to a second camera, wherein at least a portion of an item is positioned such that the item is displayed in each of the first field of view and the second field of view;
displaying on a display an itemization graphical user interface;
receiving information identifying the item generated by a user by physical manipulation of one or more keys of a keyboard, wherein the physical manipulation of each of the one or more keys causes entry of information identifying the item and selection of a menu at the itemization graphical user interface, the information identifying the item comprising at least one of the item's type, color, pattern, material, brand, manufacturer, value, label, tag, or damage; and
in response to receiving the information identifying the item generated by a user by physical manipulation of the one or more keys, performing a photography process, comprising:
taking a first field of view photo of the item using the first camera set to a first field of view, the first field of view photo corresponding to the displayed first field of view;
determining if a precondition for taking a second field of view photo of the item has been satisfied, wherein the precondition has been satisfied if the received information identifying the item comprises at least one of: identification of an item label or tag, identification of the item as valuable, or identification of the item as damaged; and
in response to determining that the precondition for taking the second field of view photo of the item has been satisfied, taking a second field of view photo of the item using the second camera, the second field of view photo corresponding to the displayed second field of view, wherein each of the first camera and the second camera do not change field of view during the photography process.

10. The method of claim 9, wherein receiving the information identifying the item generated by a user by physical manipulation of one or more keys of the keyboard comprises: selecting a plurality of menus at the itemization graphical user interface in response to user entry at a 10 key number pad of the keyboard, wherein entry of a key of the 10 key number pad causes addition of an item descriptor and selection of one the plurality of menus, and wherein selection of the plurality of menus corresponds to selecting the information identifying the item.

11. The method of claim 10, further comprising performing a pre-itemization process prior to performing the itemization process on the item, the pre-itemization process comprising:
setting up a customer if a customer does not exist for an itemization task associated with the item; and
setting up a job if a job does not exist for the itemization task.

12. The method of claim 10, further comprising:
associating a first plurality of predefined menu choices in a predefined sequential order with a first toggle, each of the first plurality of predefined sequential menu choices associated with a descriptor of an item; and
receiving data corresponding to user input selecting the first toggle,
wherein selecting each of the plurality of menus at the itemization graphical user interface in response to user entry at the 10 key number pad comprises selecting each of the first plurality of predefined menu choices in the predefined sequential order.

13. The method of claim 9, wherein the first camera and second camera are internet protocol cameras.

14. The method of claim 9, further comprising:
creating searchable image metatags for the first photo and the second photo using at least the received information identifying the item; and
transmitting the first photo and second photo over a network to a server for storage.

15. The method of claim 9, further comprising:
creating searchable image metatags for the first photo and the second photo using at least the received information identifying the item; and
storing the first photo and second photo on a storage.

16. The method of claim 9, wherein the steps of displaying on a display the first field of view and the second field of view, receiving data generated by a user by physical manipulation of one or more user input devices of the computer, and performing a photography process in response to receiving data comprising information identifying an item are repeated for a plurality of items.

17. The method of claim 9, wherein the first camera and second camera are an integrated camera module with a first field of view and a second field of view, and wherein the integrated camera module takes the first field of view photo and second field of view photo.

\* \* \* \* \*